United States Patent
Walley et al.

(10) Patent No.: US 10,154,443 B2
(45) Date of Patent: Dec. 11, 2018

(54) CROSS RADIO ACCESS TECHNOLOGY HANDOFF USING CACHING

(71) Applicant: Avago Technologies International Sales Pte. Limited, Singapore (SG)

(72) Inventors: John Walley, Ladera Ranch, CA (US); Wael Diab, San Francisco, CA (US); Kamlesh Rath, San Ramon, CA (US); Raymond Hayes, Los Gatos, CA (US); Murat Mese, Rancho Palos Verdes, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 620 days.

(21) Appl. No.: 14/295,282

(22) Filed: Jun. 3, 2014

(65) Prior Publication Data

US 2014/0378141 A1 Dec. 25, 2014

Related U.S. Application Data

(60) Provisional application No. 61/892,393, filed on Oct. 17, 2013, provisional application No. 61/830,567, filed on Jun. 3, 2013.

(51) Int. Cl.
*H04W 36/00* (2009.01)
*H04W 36/02* (2009.01)

(52) U.S. Cl.
CPC .................. *H04W 36/023* (2013.01)

(58) Field of Classification Search
CPC ................ H04W 36/0011; H04W 36/02
USPC ................ 455/436–444; 370/331–332
See application file for complete search history.

(56) References Cited

U.S. PATENT DOCUMENTS

| | | | | |
|---|---|---|---|---|
| 6,577,868 B1* | 6/2003 | Vialen | ............ | H04L 49/203 370/331 |
| 2005/0255856 A1* | 11/2005 | Griffin | ............ | H04W 36/0083 455/456.1 |
| 2006/0077994 A1* | 4/2006 | Spindola | ............ | H04J 3/0632 370/412 |
| 2008/0085711 A1* | 4/2008 | Alberi-Morel | ........ | H04W 36/02 455/437 |
| 2009/0016299 A1* | 1/2009 | Watanabe | ............ | H04W 36/02 370/331 |
| 2009/0285175 A1* | 11/2009 | Nix | ............ | H04L 29/125 370/331 |
| 2010/0202322 A1* | 8/2010 | Cai | ............ | H04W 76/38 370/254 |
| 2011/0096754 A1* | 4/2011 | Harris | ............ | H04W 36/02 370/332 |
| 2014/0199980 A1* | 7/2014 | Rao | ............ | H04W 4/029 455/414.1 |

(Continued)

*Primary Examiner* — Dung Hong
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments for handing off wireless communication. The apparatus comprises an antenna configured to receive data from a first access point; a cache configured to store the data; and a controller configured to predict when the transceiver will hand off a connection from the first access point to a second access point and request a burst of data from the first access point to supplement the data in the cache in preparation for the hand off.

17 Claims, 10 Drawing Sheets

(56) References Cited

U.S. PATENT DOCUMENTS

| | | | |
|---|---|---|---|
| 2014/0256326 A1* | 9/2014 | Morgan | H04W 36/0016 455/437 |
| 2015/0146689 A1* | 5/2015 | Fu | H04J 3/0632 370/331 |

* cited by examiner

CROSS RADIO ACCESS TECHNOLOGY HANDOFF USING CACHING

CROSS-REFERENCE TO RELATED APPLICATION(S)

The present application claims the benefit of U.S. Provisional Application No. 61/830,567, filed Jun. 3, 2013, which is incorporated herein by reference in its entirety, and U.S. Provisional Application No. 61/892,393, filed Oct. 17, 2013, which is incorporated herein by reference in its entirety.

FIELD OF DISCLOSURE

The present disclosure relates generally to cross radio access technology (RAT) communications and more specifically to the utilization of various caching techniques within a cross RAT system to improve communication performance and handoffs.

BACKGROUND

Cross RAT systems are often used to meet wireless network loading demands. In a cross RAT system; different wireless technologies within a network system provide alternate pathways for connectivity to a central node. Communication devices connect to the central node using the different wireless technologies to access one or more network services.

Larger base stations may potentially service a large number of communication devices, and therefore cross RAT systems supplement these base stations with smaller, lower range access points (APs). By offloading traffic from the base stations to the APs, the network load can be managed. Handling when and how such handoffs in cross RAT systems occur is a challenging part of network load management.

BRIEF DESCRIPTION OF THE DRAWINGS/FIGURES

Figure 1:
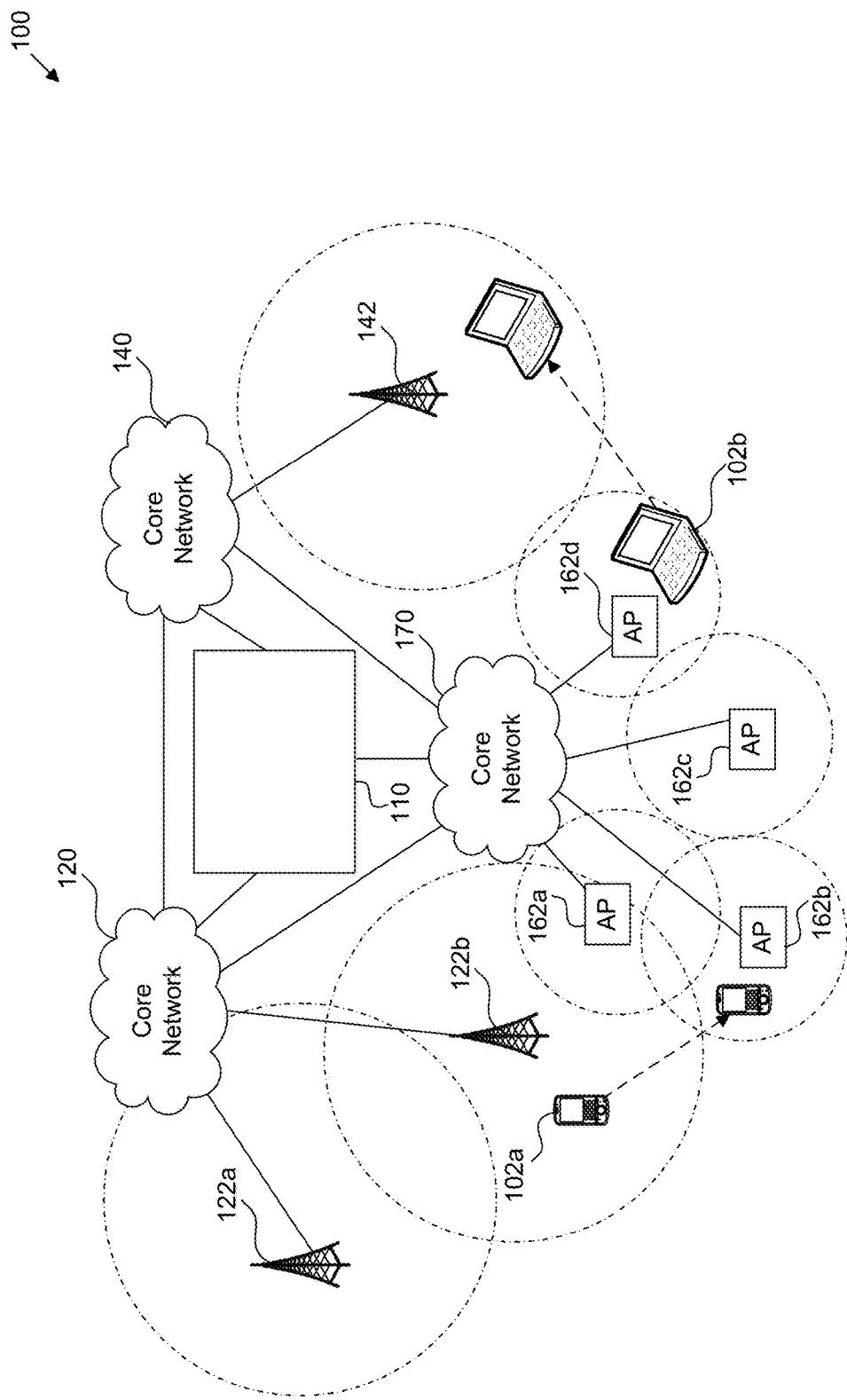
FIG. 1 illustrates a cross radio access technology (RAT) system according to an exemplary embodiment of the disclosure.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

The following Detailed Description refers to accompanying drawings to illustrate exemplary embodiments consistent with the disclosure. References in the Detailed Description to "one embodiment," "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail may be made therein without departing from the spirit and scope of the disclosure. Thus the disclosure should not be limited by any of the above-described exemplary embodiments, but should be defined only in accordance with the following claims and their equivalents.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include non-transitory machine-readable mediums such as read only memory (ROM); random access memory (RAM); magnetic disk storage media; optical storage media; flash memory devices; and others. As another example, the machine-readable medium may include transitory machine-readable medium such as electrical, optical, acoustical, or other forms of propagated signals (e.g., carrier waves, infrared signals, digital signals, etc.). Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

FIG. 1 illustrates an exemplary operating environment 100 having multiple RAT integrating intelligent caching according to an exemplary embodiment of the disclosure. Operating environment 100 includes multiple networks (e.g., Network A, Network B, and Network C) each utilizing a different RAT. Two or more of these networks could be operated by the same service provider. Alternatively, each of the networks may be standalone, separately operated networks.

Network A may be a cellular network such as a third generation (3G), further generation (4G), or LTE network. Network A includes a core network 120 connected to one or more base stations such as base stations 122a and 122b. The base stations of network A may utilize a RAT such as CDMA, W-CDMA, CDMA2000, FDMA, OFDMA, or similar. Each base station has a corresponding coverage area as illustrated in FIG. 1 by the dashed circles. Core network 120 may include multiple switching elements, one or more servers hosting applications and/or content, and/or one or more database or storage elements (not shown).

Network C may be another cellular network or alternatively a network utilizing WiMAX (802.16e) or similar communication. Network C also includes core network 140 and one or more base stations such as base station 142 coupled to core network 140. Base station 142 also has an associated coverage area illustrated by the associated dashed circle of FIG. 1. Core network 140 also may include multiple routing elements, one or more servers hosting applications and/or content, and/or one or more database or storage elements (not shown).

Network B includes multiple access points (AP) coupled to a core network 170. The individual APs may be owned and/or operated by separate entities (e.g., businesses or individuals). In addition or alternatively, multiple APs may be owned and/or operated by the same provider. APs 162 typically support a wireless data RAT such as 802.11. The coverage areas for APs are generally smaller than the coverage area of a base station, as illustrated in FIG. 1. Core network 170 may be a public data network such as the Internet, a private data network or a combination therefor. Core network 170 may include multiple routing elements, one or more servers hosting applications and/or content, and one or more database elements.

Operating environment 100 further includes one or more content providers 110. Content provider 110 may be component of a network such as network A, B, or C or may be provided separately. In an example, content provider 110 may be a video content provider such as a television network or video distribution service (e.g., Amazon, Netflix, or hulu). In a further example, a content provider 110 may provide an application such as a gaming application. Core networks 120, 140, and 170 are configured to communicate with one another and with one or more content provider 110.

Operating environment further include multiple user devices 102, also referred to as UE 102. UE 102 may be any device supporting multiple RATs such as a smartphone device, laptop computer, PDA, or similar.

For the sake of simplicity, each of core networks 120, 140, and 170 is illustrated with a single RAT, and provided network services to two UEs: 102a and 102b. However, as will be appreciated by those of ordinary skill in the art, content provider 110 may be coupled to any number of core networks, which in turn may be coupled to any number of base stations and/or AP's. Base stations 122a, 122b, 142, and APs 162a-162d may provide wireless communications to any number of UEs in addition to UEs 102a and 102b. Each of core networks 120, 140, and 170 may be coupled to more than one type of RAT. For example, core network 170 may farther be coupled to any number of base stations to comprise a heterogeneous network.

Core networks 120, 140, and 170 are configured to provide any number of network services to UEs 102a and 102b. Examples of network services may include voice and/or data services. UEs 102a and 102b are configured to communicate with any of core networks 120, 140, and 170 using any type of RAT.

As illustrated in FIG. 1, UE 102a may initially receive one or more network services from core network 120 via base station 122b, and then switch, or handoff service, to core network 170 via AP 162b. Similarly, UE 102b may initially receive one or more network services from core network 170 via AP 162d, pass through a dead zone, and then handoff services to core network 140 via base station 142.

A handoff may be triggered by any number of conditions. For example, network services may be handed off from AP 162d to base station 142 when UE 102b moves from one coverage area to another. To provide another example, network services may be handed off from base station 122b to AP 162b when UE 102a is in a location that is served by one or more coverage areas, but communications performance between core network 120 or 170 is improved using one AP and/or base station over another. In other words, network services provided between UE 102a and core network 120 via base station 122b may be of a lower quality than network services provided between UE 102a and core network 170 via AP 162a, or vice versa.

Caching Bursts of Data

Figure 2:
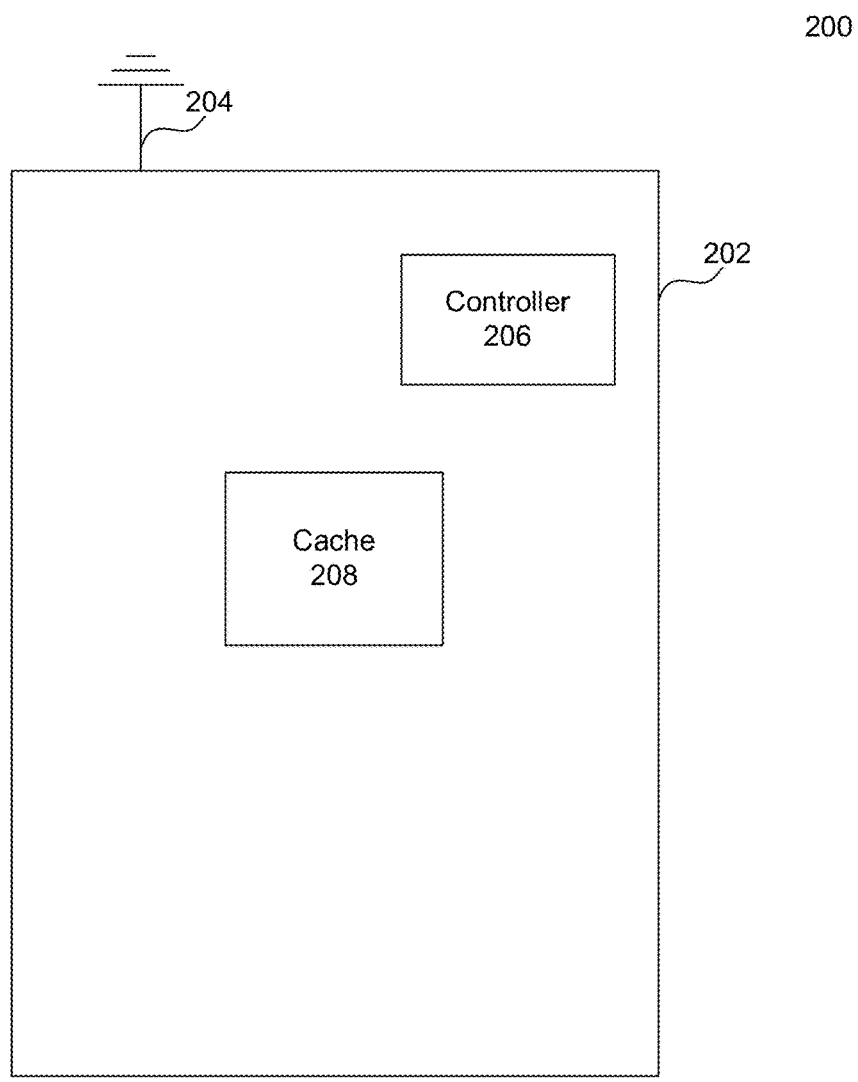
FIG. 2 illustrates an user equipment (UE) according to an exemplary embodiment of the disclosure.

FIG. 2 illustrated a UE 202. UE 202 can represent UEs 102a or 102b illustrated in FIG. 1. UE 202 includes one or more antennas 204, controller 206, and cache 208.

Antenna 204 can be configured to wirelessly communicate with one or more networks. It can be configured to wirelessly communicate with base stations, for example base stations 122a, 122b, or 142 in FIG. 1. It can also be configured to wirelessly communicate with access points, for example access points 162a-d in FIG. 1. Antenna 204 can be configured to wirelessly communicate with other network elements as well.

Controller 206 can be configured to monitor the UE's location, to predict when a handoff event may occur, and to monitor cache 208, as described in more detail below. Controller 206 can be configured to monitor different aspects regarding the UE's location, for example wireless signal strengths received by antenna 204, GPS signals, etc. These aspects being monitored are merely used as examples, and a person of skilled in the art would understand other techniques used for location based services could be used to monitor these or other aspects. Controller 206 can be configured to use some or all of this information to predict when handoff events may occur. For example, if the signal strength of the current base station is weaker than the signal strength of a second base station, the controller 206 may predict that the handoff event will occur shortly. Controller 206 may also be configured to identify known dead zones.

Cache 208 can be configured to temporarily store data received via antenna 204. It may be configured to be grow or shrink in size. Controller 206 can be configured to manipulate the size of cache 208. For example, controller 206 may increase the size of cache 208 in order to store bursts of information.

Figure 3:
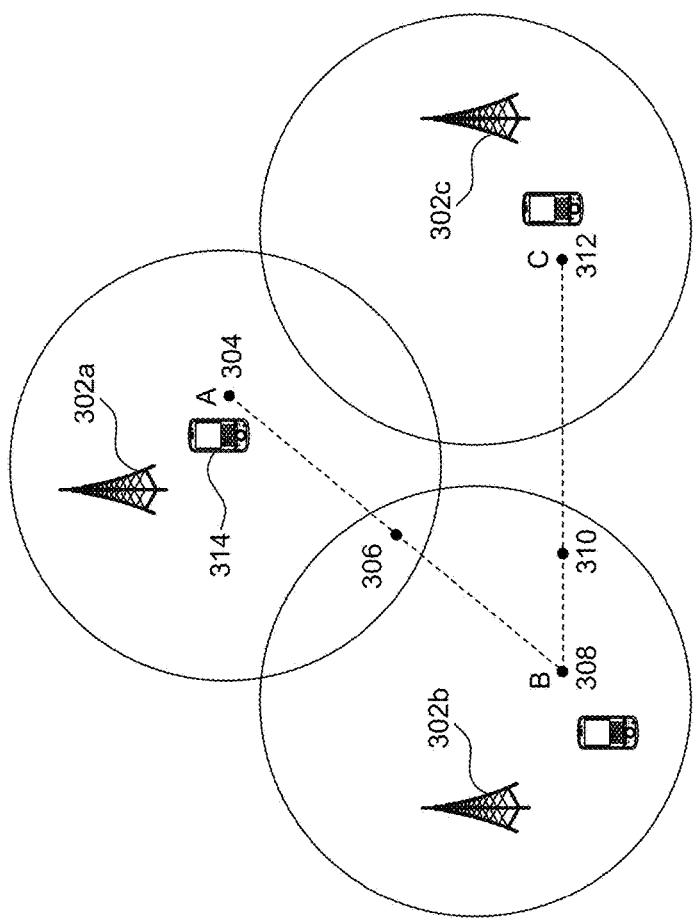
FIG. 3 illustrates an UE traversing a RAT system according to an exemplary embodiment of the disclosure.

FIG. 3 illustrates an exemplary operating environment in which UE 314, for example UE 102a or 102b in FIG. 1, moves between the coverage areas of three base stations 302a-c, specifically moving from point A 304 to point B 308, and ending up at point C 312. Base stations 302a-c could be the base stations illustrated in FIG. 1, i.e., 122a, 122b, and 142. While FIG. 3 illustrates only base stations, a person skilled in the art would understand any or all of these base stations could be other network elements, access points or eNBs, for example.

In one example UE 314 moves from point A 304 to point B 308 as illustrated in FIG. 3. At point A 304, the antenna in UE 314 receives data from base station 302a. As UE 314 travels from point A 304 to point B 308, it will encounter a point at which it can receive signals from both base stations 302a and 302b. At a point, marked as 306 in FIG. 3, UE 314 will predict that it will be handing off wireless communication from base station 302a to base station 302b. This prediction can be based on the location of UE 314, determined, for example, by GPS or other location based services. This prediction may alternatively, or in addition, be based on the signal strengths of data received from base stations 302a and 302b or the changes in the signal strengths received. A person skilled in the art would understand this prediction can be based on other mechanisms, either alone or in combination with those disclosed above.

After UE 314 predicts that it will hand off to base station 302b, but prior to executing the hand off, UE 314 can request a burst of data from base station 302a. By requesting, and later receiving, the burst of data from base station 302a, UE 314 may store additional information in its cache, for example cache 208 illustrated in FIG. 2. In order to store this additional data, UE 314's controller, for example controller 206 illustrated in FIG. 2, can increase the amount of storage allocated to the cache. For example, space allocated previously for permanent memory, may temporarily be allocated as additional cache storage. A person skilled in the art would understand that there are many additional ways to allocate addition storage to cache, including only allocating a portion of the cache device initially, and then allocated more as needed.

By storing additional data in the cache, UE 314 can provide additional functionality not possible previously. For example, for applications that require a specific Quality of Service (QoS), UE 314 can continue to provide this QoS, while the hand off takes place. For example, if an application is streaming a movie, by storing an additional minute of the movie in cache, the user can continue to watch the movie without any noticeable interruption, while UE 314's wireless communication is handed off from base station 302a to base station 302b. In addition, if there is more than one available wireless communication provider accessible at point 306, UE 314 provides the stored data to applications while UE 314 determines the network to hand off its wireless communication to. This determination can be based on cost (in terms of money or resources), QoS provided, or other factors known to a person skilled in the art.

After the wireless communication has been handed off to base station 302b, UE 314 can return to its initial state. For example, if the cache has been enlarged as described above, it may be reduced back to its original size. This can be done for multiple reasons including reducing resource usage (for example, if the additional cache took more power to maintain) or increase other memory devices (for example is memory was reallocated from permanent memory areas for use by the cache.)

In another example, UE 314 can move from point B 308 to point C 312. In this example, the controller may predict at point 310 along the path that UE 314 will be entering a dead zone. A dead zone is an area where a UE does not have access to any wireless communication. For example, in FIG. 3, there is a dead zone between coverage service area of base station 302b and 302c. In response to predicting the dead zone at point 310, the controller may, as described above, request a burst of data in addition to additional cache allocation. By requesting, and receiving, a burst of data, the UE 314 can continue to provide data for applications, even while in the dead zone. Depending on the amount of data stored by UE 314 and the size of the dead zone, the UE 314 may be able to traverse the dead zone before it is necessary to download more information over the wireless communication. Upon identifying a new wireless communication service provider, for example base station 302c, UE 314 can hand off its wireless communication from base station 302b to 302c and continue executing its applications.

Figure 4:
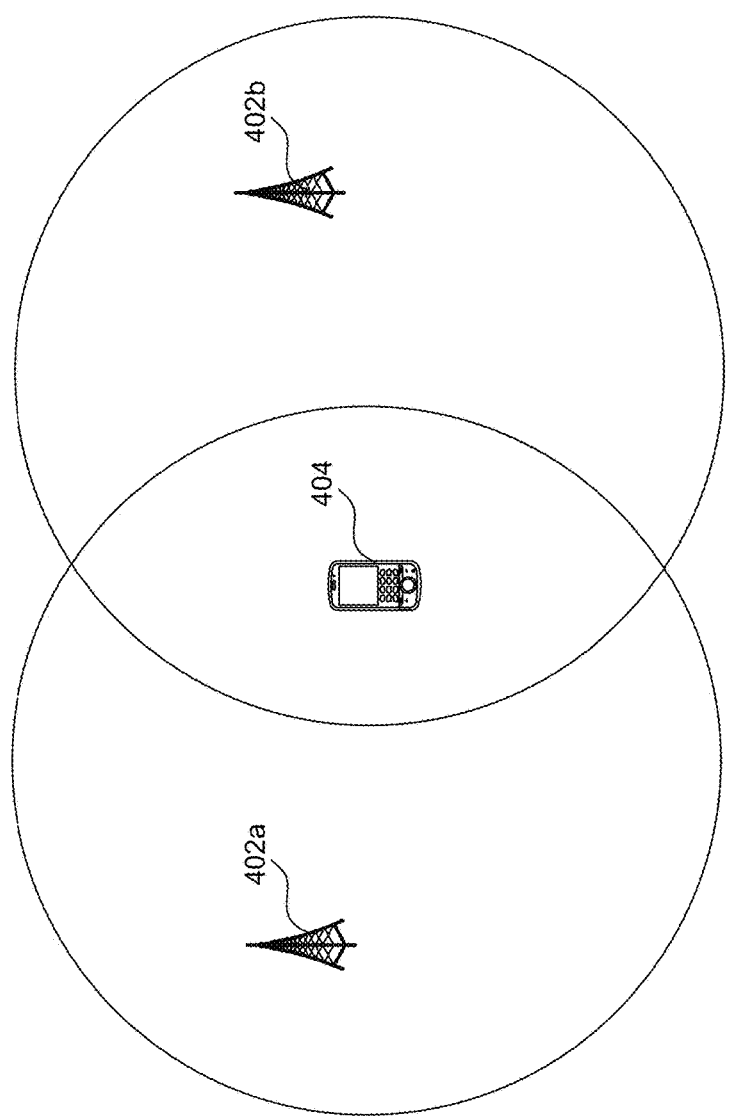
FIG. 4 illustrates an UE accessing different wireless communication service providers within a RAT system according to an exemplary embodiment of the disclosure.

FIG. 4 illustrates a UE 404, for example UE 102a or 102b in FIG. 1, within the coverage service area of both base station 402a and 402b. Base station 402a and 402b can use different radio access technologies. For example, base station 402a may support wireless communication using the 802.16e standard that allows for up to a 1 Mbit/s data rate. Base station 402b may support wireless communication using the 802.11n standard that allows for up to a 600 Mbit/s data rate. It may cost more, in terms of service costs, resource costs, or other costs, to use base station 402b.

In an embodiment, UE 404 can default to wirelessly communicating with base station 402a, due to the lower costs. But UE 404 may use data faster than base station 402a can provide the data, for example when streaming video. In this case, when the cache on UE 404, for example cache 208 illustrated in FIG. 2, reaches a threshold amount, for example when only 20% of the cache remains filled, the controller on UE 404, for example controller 206 illustrated in FIG. 2, may hand off wireless communication from base station 402a to 402b.

Once handed off, the controller may predict that a hand off will occur from base station 402b to 402a. This prediction may be based on the higher costs of communicating with base station 402b. Based on that prediction, the controller may request a burst of data in order to cache extra data to be used after the hand off is complete. After requesting and receiving the burst of data, the controller may hand off wireless communication from base station 402b to 402a. At this point, due to the burst of data and higher data rate available on base station 402b, the cache may be above the threshold amount, for example 80% of the cache may be filled.

Using this technique, the UE 404 may minimize the costs of wireless communication while maintaining the QoS required by one or more applications.

Figure 5:
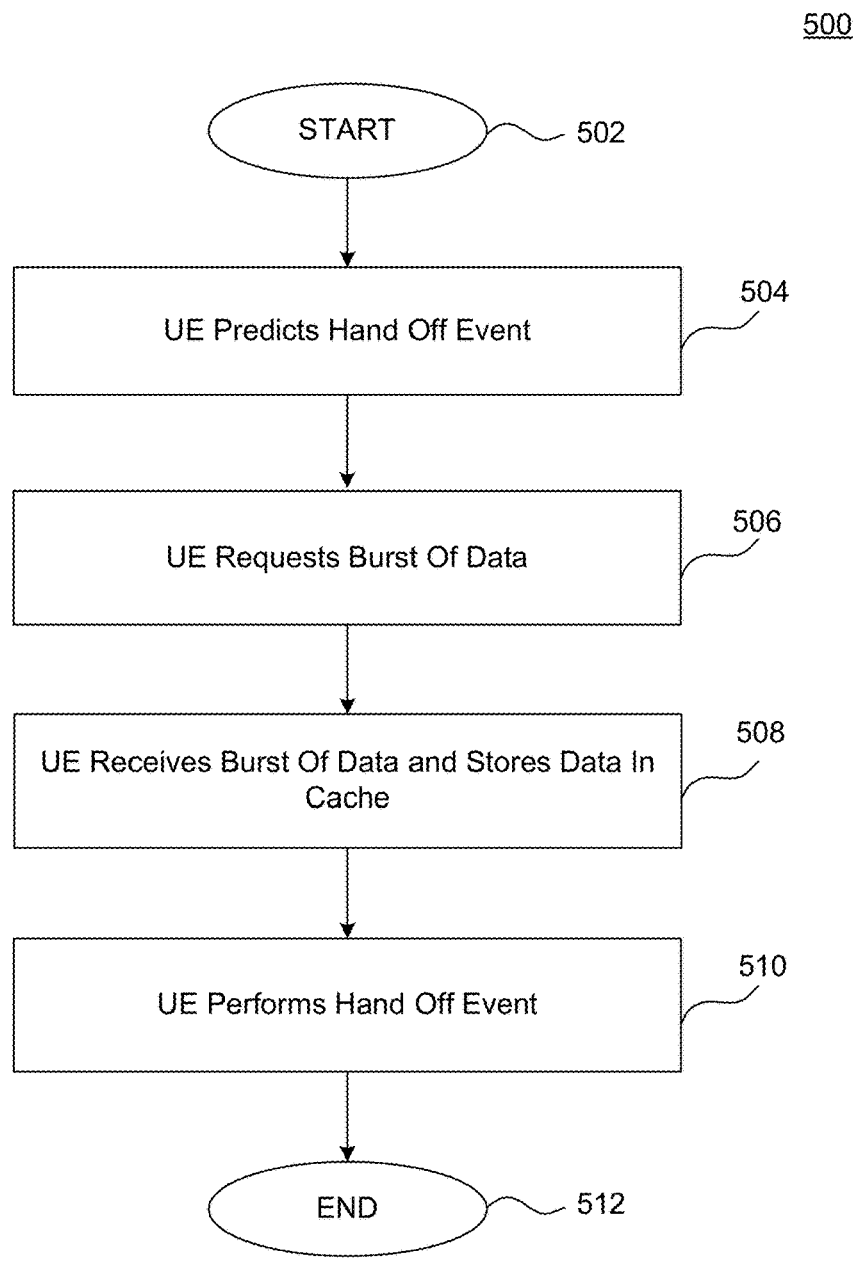
FIG. 5 illustrates a method for handing off wireless communication services between two providers using burst request and caches, according to an exemplary embodiment of the disclosure.

FIG. 5 is a flowchart of the hand off event using bursts of data with caches, according to an embodiment of the disclosure.

At step 502, the process starts.

At step 504, the UE, for example UEs 102a and 102b of FIG. 1, UE 202 of FIG. 2, UE 314 of FIG. 3, or UE 404 of FIG. 4, predicts a hand off event. As described above, this prediction can be based on the location of the UE using GPS or other location based services. This prediction may be based on UE motion information. This prediction may also be based on the strength of the current wireless communication service, on the strength of other available wireless communication services, or a combination thereof. A person skilled in the art would understand that these are merely examples of how the prediction can be accomplished, and that other known methods can be used.

At step 506, the UE requests a burst of data. This will allow the UE to continue to operate while the hand off is performed. The amount and type of data requested may depend on the type of network that the wireless communication is being handed off to. For example, if the network being handed off to can handle voice date more efficiently, then the UE may request a burst of video data prior to hand off or vice versa.

In addition to requesting a burst of data, the UE can also increase the size of its cache using known methods. This may require powering up additional banks of the cache storage device or allocating space in main memory to the caching system.

At step 508, the UE receives the requested burst of data and stores it in cache. At this point the UE can identify whether there are multiple communication networks for hand off. Where there are multiple communication networks, the UE can determine which network to hand off to, for example by identifying an optimal option. The UE can use multiple factors in determining the optimal option, including cost (in terms of money or resources), QoS provided, or other factors known to a person skilled in the art.

While identifying and determining the optimal option, the UE can continue to provide the QoS needed by its applications using the data that has previously been cached.

If there is only one option, the UE can either hand off to that wireless communication service, or continue to run using the cached data. This both allows the UE to continue to provide the QoS required by the UE's application in addition to allowing the UE to continue to search for additional wireless communication service options.

If, no wireless communication services are available, e.g., when entering a dead zone, the UE can continue to provide the QoS required by the UE's application using the data that has been stored in cache.

At step 510, once the wireless communication service has been identified, the UE can hand off wireless communication from its old service to the newly identified service. At that point, as shown at step 512, the process of handoff by storing a burst of data in the cache is complete.

Caching within the RAT Network

In addition to improving hand off in a RAT Network using UE caches and bursts of data, hand off can be improved by implementing caching at different nodes within the RAT network as well.

Figure 6:
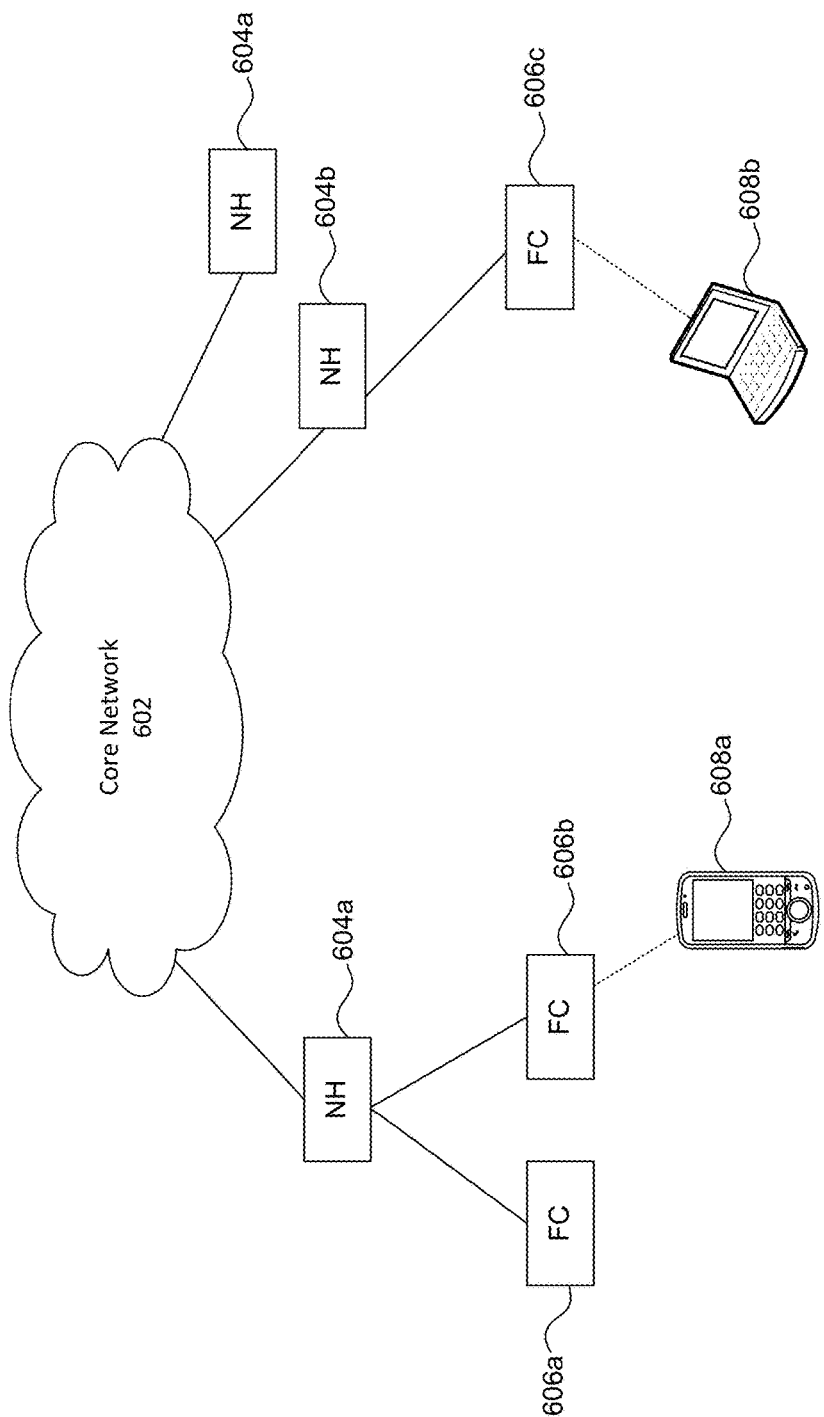
FIG. 6 illustrates an multiple levels of a RAT system architecture according to an exemplary embodiment of the disclosure.

FIG. 6 illustrates an exemplary cross RAT system, similar to FIG. 1, according to an exemplary embodiment of the disclosure. Cross RAT system 600 includes a core network 602, network hubs 604a-c, femto cells 606a-c, and UEs 608a and 608b. As will be appreciated by those skilled in the art, other network configurations are possible without deviating from the teachings of this disclosure.

For the sake of simplicity, core network 602 is illustrated with a single RAT, and provided network services to two UEs: 102a and 102b. However, as will be appreciated by those skilled in the art, core network 602 may be coupled to any number of network hubs 604, which in turn may be coupled to any number of femto cells. Femto cells 6061-c may provide wireless communications to any number of UEs in addition to UEs 102a and 102b. Core network 602 may be coupled to more than one type of RAT. For example, core network 602 may further be connected to any number of femto cells to comprise a heterogeneous network.

Core network 602 is configured to provide any number of network services to UEs 102a and 102b. Examples of network services may include voice and/or data services. UEs 102a and 102b are configured to communicate with core network 602 using any type of RAT.

Each level of the network illustrated in FIG. 6 can include a storage element configured to cache data at that level. For example, the each element in FIG. 6, i.e., core network 602, network hubs 604a-c, femto cells 606a-c, and UEs 608a and 608b, can include one or more memory devices configured to cache data at that level. Alternatively, one or more elements can include a data storage facility. In particular, more centralized portions of the network, for example the core network or the network hubs, can include a data storage facility to cache data transmitted between content providers (not shown), and UE devices.

Figure 7:
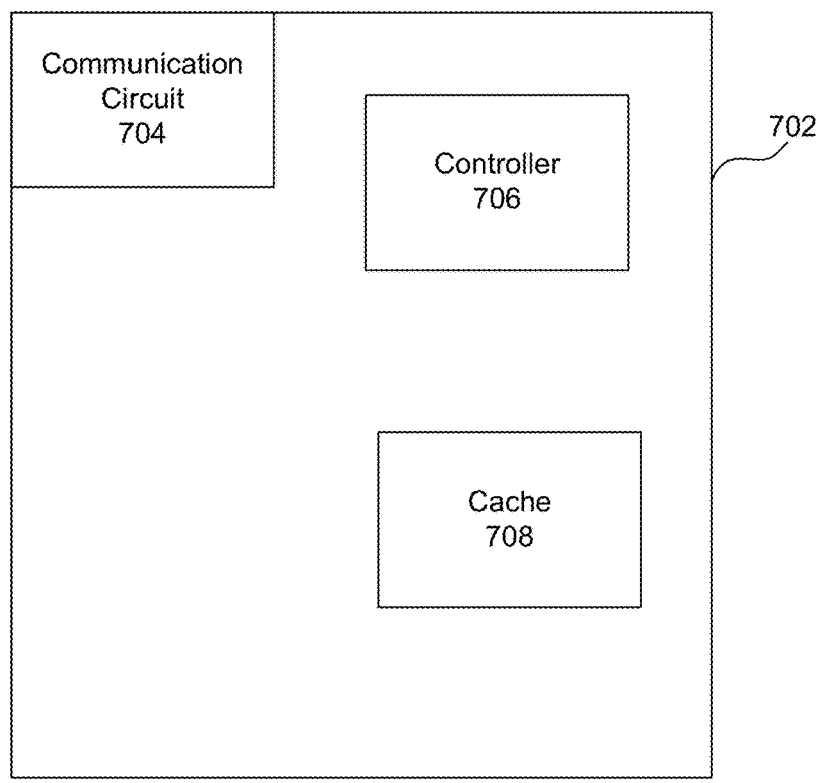
FIG. 7 illustrates an network element according to an exemplary embodiment of the disclosure.

FIG. 7 shows an example network element 702 that has been configured to cache data. Network element 702 can be an example of core network 602, network hubs 604a-c, femto cells 606a-c, and UEs 608a and 608b illustrated in FIG. 6. Network element 702 includes a communication circuit 704, a controller 706, and a cache 708.

Communication circuit 704 can be configured to provide wireless communication, for example femto cells 606a-c in FIG. 6, base stations 122a, 122b, and 142 in FIG. 1, or access points 162a-d in FIG. 1. Communication circuit 704 can include an antenna in order to provide the wireless communication. Communication circuit 704 can alternatively be configured to provide communication over wires, for example the core networks in FIGS. 1 and 6. In addition, communication circuit 704 can be configured to provide both wireless communication and communication over a wire.

Controller 706 can be configured to monitor and manage cache 708 and communicate with other network elements. Controller 706 can be configured to monitor different aspects of the cache usages, UEs using this network element, available caches at other network elements, etc. These are merely used as examples, and a person of skilled in the art would understand that the controller can be configured to monitor other aspects of the network element, UEs, and network. In addition, controller 706 can be configured to monitor UEs for requests to cache data on the network as well as identify multiple UEs requesting the same or similar data.

Cache 708 can be configured to temporarily store data received from communication circuit 704. Cache 708 can be a memory storage device, for example a flash memory device, RAM, SRAM, SDRAM, a data center, a RAID arrayed set of hard drives, etc.

Caching within the network provides the system the ability to more efficiently utilize network bandwidth. For example, multiple UEs may be interested in watching the same video, for example the Superbowl. Some may want to view the video at the same time, for example by viewing it live, while others were viewing it at a later time.

Looking at FIG. 6, three UE devices (not pictured) may be connected to femto cell 606a and three different LIE devices (not pictured) may be connected to femto cell 606b. All six devices request the same video from a content provide connected to the core network 602. Without caching, the content provider would have to provide six streams of data to core network 602, which in turn would send six streams of data to network hub 604a. Network hub 604a would then send three streams of data to both femto cells 606a and 606b. Each of the femto cells would then send a stream of data to each of the UE devices that requested the video. All of this may be required because different UE's may process the data at different speed, require different QoS, etc.

Figure 8:
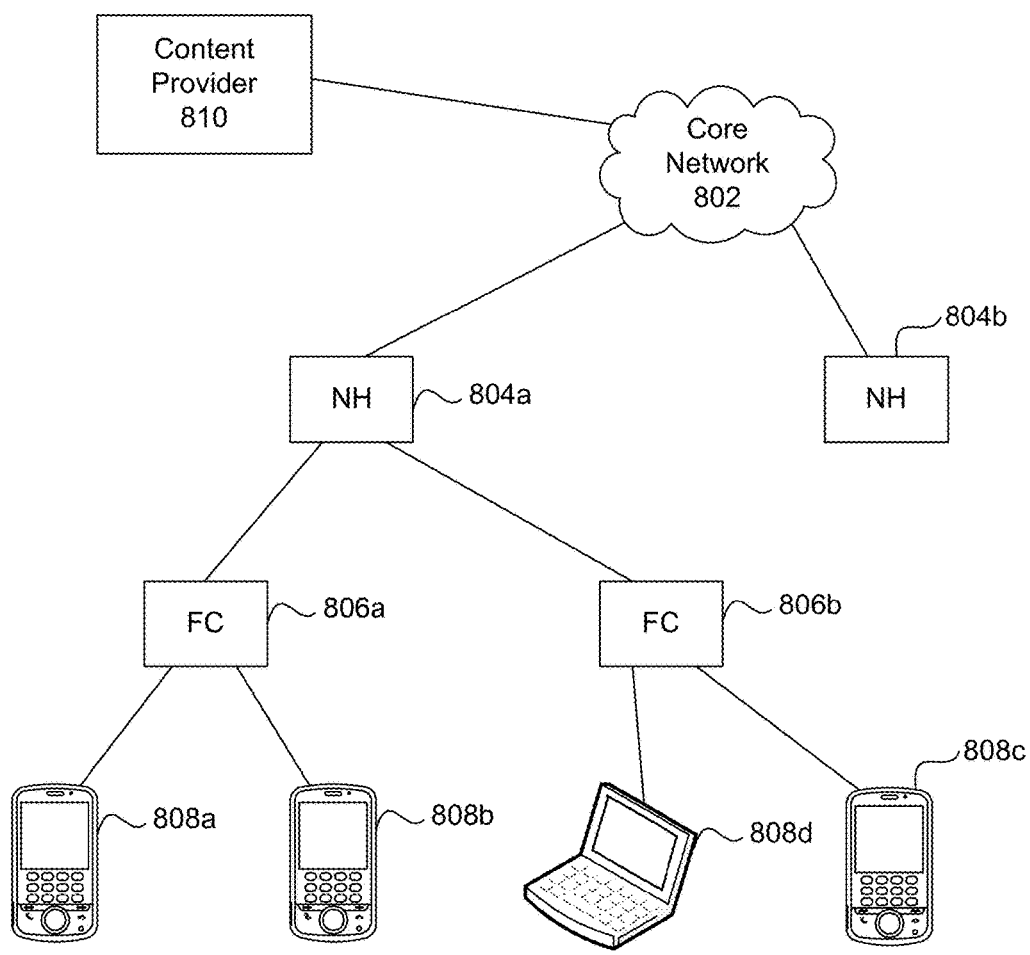
FIG. 8 illustrates multiple UEs accessing the same wireless communication service provider within a RAT system according to an exemplary embodiment of the disclosure.

FIG. 8 illustrates an example system where multiple UEs, for example UEs 808a-d, are receiving the same content from a single content provider, for example content provider 810. Content provider 810 can provide content to users using core network 802. Core network 802 can be connected to multiple network elements, for example network hubs 804a and 804b. Network hub 804a can be connected to multiple femto cells, for example femto cells 806a and 806b. Multiple UEs, for example UE 808a-d, can connect to the network using the femto cells, as illustrated.

If multiple UEs, for example UE 808a-d, request the same or similar data from content provided 810 the network may intelligently choose to cache this information at network elements, thereby reducing the network communication load and freeing up resources for other tasks. For example content provided 810 can be CBSsports.com, and be providing streaming data of the Superbowl to UEs 808a-d. As UEs 808a and 808b request data, the controller in femto cell 806a can recognize that the UEs are requesting the same data. Femto cell 806a can then merely make a single request for the superbowl data, thereby reducing the bandwidth. By caching the data, femto cell 806a can service both UE 808a and UE 808b even if they are requesting data at slightly different times (for example if one of the viewers paused the game for a few minutes and then wishes to continue viewing the game from the moment it was paused).

In another example, the controller in network hub 804a may be configured to identify when it is receiving requests for the same or similar data from UEs 808a-d via femto cells 806a-b. Depending on network bandwidth, caching resources, data usage, cache usage at network hub 804a, cache usage at femto cells 806a-b, required QoS of the data, etc. the controller in network hub 804a may choose to cache data, for example the streaming superbowl game, in core network 802, femto cells 806a-b, or in its own cache. The further the data is cached from the UEs, the more resources are required to provide high QoS. But there may be more caching resources available at different levels of the network. Thus, the controller can be configured to request that the data be cached at different levels, based on these resource, network, and data centric restrictions.

The two examples provided above are merely exemplary embodiments. A person skilled in the art would understand that the functionality described above could be provided at any level of the network, and that additional functionality could be provided in place of, or in addition to, the functionality described above.

By using caching within the network, many of the redundant streams of data can be removed, freeing up addition bandwidth for other network services. In the previous example, if all the UE devices were requesting the same QoS, but were not exactly synchronizes with regard to where they were in the video, a single stream of the video could be sent to the core network 602. Depending on circumstances, the core network could cache the video until requested by a UE, or could request that a different node cache the video.

Caching at different levels in the network may provide different advantages and disadvantages, for example speed of getting data to the UE devices, available storage, accessibility to UE devices, etc. The content can be cached at different levels depending on the needs of the UE devices, and the available resources in the network.

Caching within the network may also be useful in improving other network services. As described above, caching bursts of data at the UE device prior to entering a dead zone allows a device to continue to provide content to a user until it can establish a new connection with the network. Caches within the network may be used to provide data to the UE as soon as it completes the band off. As discussed above, when a UE predicts that it will be entering a dead zone, it can request a burst of data and store that data in its cache.

The UE can also predict which wireless communication service provider it will establish connection with on the other side. For example, in FIG. 3, when traveling from point B 308 to point C 312, the UE can predict that it will hand off to base station 302c. If caching has been implemented in the network, prior to entering the dead zone, the UE can request that the wireless service provider it will hand off to, for example base station 302c, cache additional data. Thus, when the UE enters the wireless service provider's coverage area and hands off wireless communication, the wireless service provider has data ready to be communicated to the UE.

Figure 9:
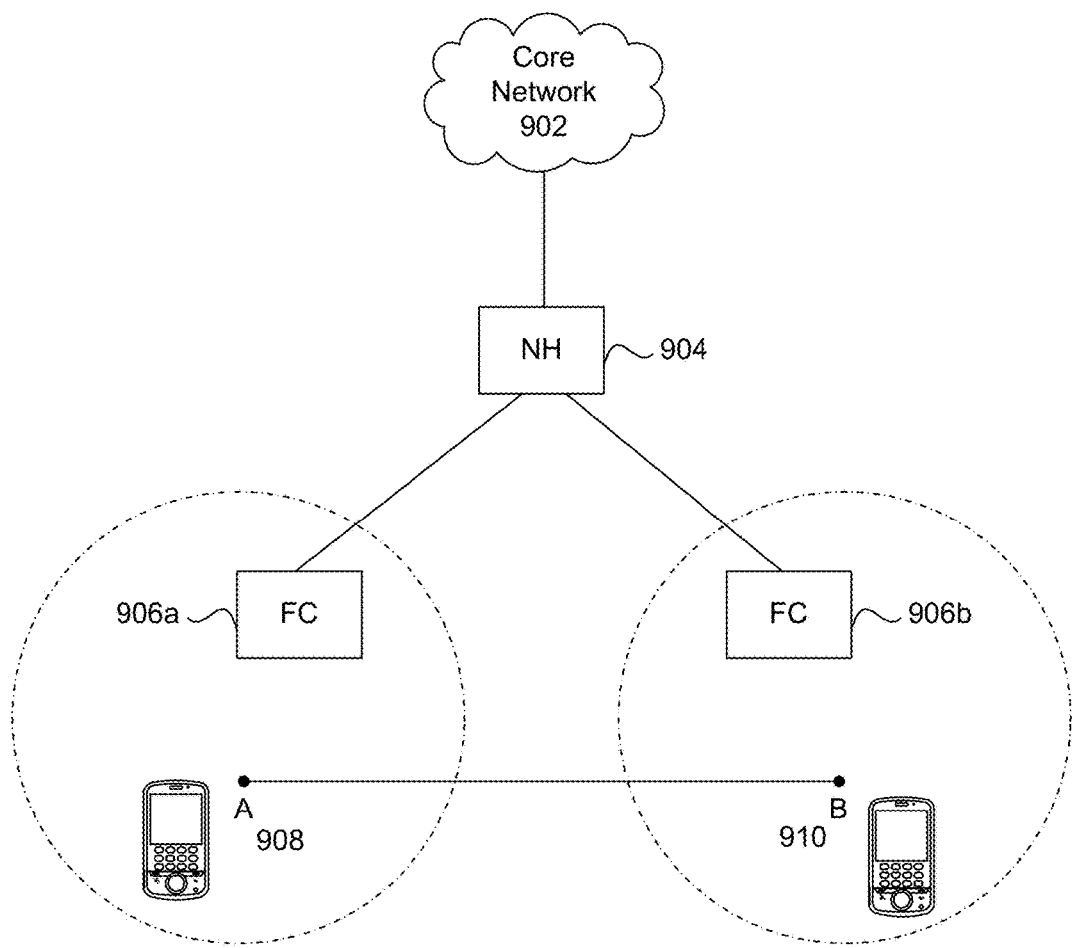
FIG. 9 illustrates an UE traveling from one wireless communication cover area to another according to an exemplary embodiment of the disclosure.

FIG. 9 illustrates an example where a UE moves from the coverage area of femto cell 906a to the coverage area of femto cell 906b after traversing a dead zone. Femto cells 906a and 906b are part of a network that also comprises network hub 904 and core network 902.

As discussed above, with regard to FIG. 3, a UE can predict when it may be entering a dead zone, for example by using location based services or analyzing the strength of the signals it is receiving. While a UE can predict that it will be entering a dead zone, and can request a burst of data in order to continue to provide services to it user while it is in the dead zone, it still must re-establish a connection with the network at the new network element, for example an access point, base station, or femto cell, and request data from the content provider.

In an embodiment, prior to entering the dead zone, the UE can request that data be cached at a network element on the network it will be handing off communication to. For example, in FIG. 9, the UE at location A 908 can approach the edge of the coverage area for femto cell 906a. As the UE approaches the edge of the coverage area, it may predict that it will be entering a dead zone. It can be configured to request that femto cell 906b be prepared to provide it with additional data. For example, if a user is reading an article, the UE may request that femto cell 906b be prepared to provide it with the next page.

The network, for example core network 902, network hub 904, or femto cells 906a and 906b, can be configured to determine where to cache the data. For example, the network may have already cached the data at network hub 904, as discussed above. Or the network may determine to cache the data at femto cell 906b. This determination can be based on information about the data, for example the QoS required and its size, and on information about the network, for example where available cache space is located and the latency to get data from a cache to a UE. A person skilled in the art would understand that other information may also affect this determination.

Caching within the network to reduce the impact of dead zones can be used in conjuncture with caching within the UE to traverse dead zones as described above. For example, in FIG. 9, the UE may be streaming video. Therefore it may request a burst of data prior to leaving the coverage area of femto cell 906a, so that it may continue to stream the video, for example an additional minute of data. It may also request that the next minute of video be cached at the network element it will be handing off wireless communication to, in this example femto cell 906b. This would allow the UE to quickly refill its cache and continue to match the applications required QoS, while limiting the downtime experienced by the user.

Figure 10:
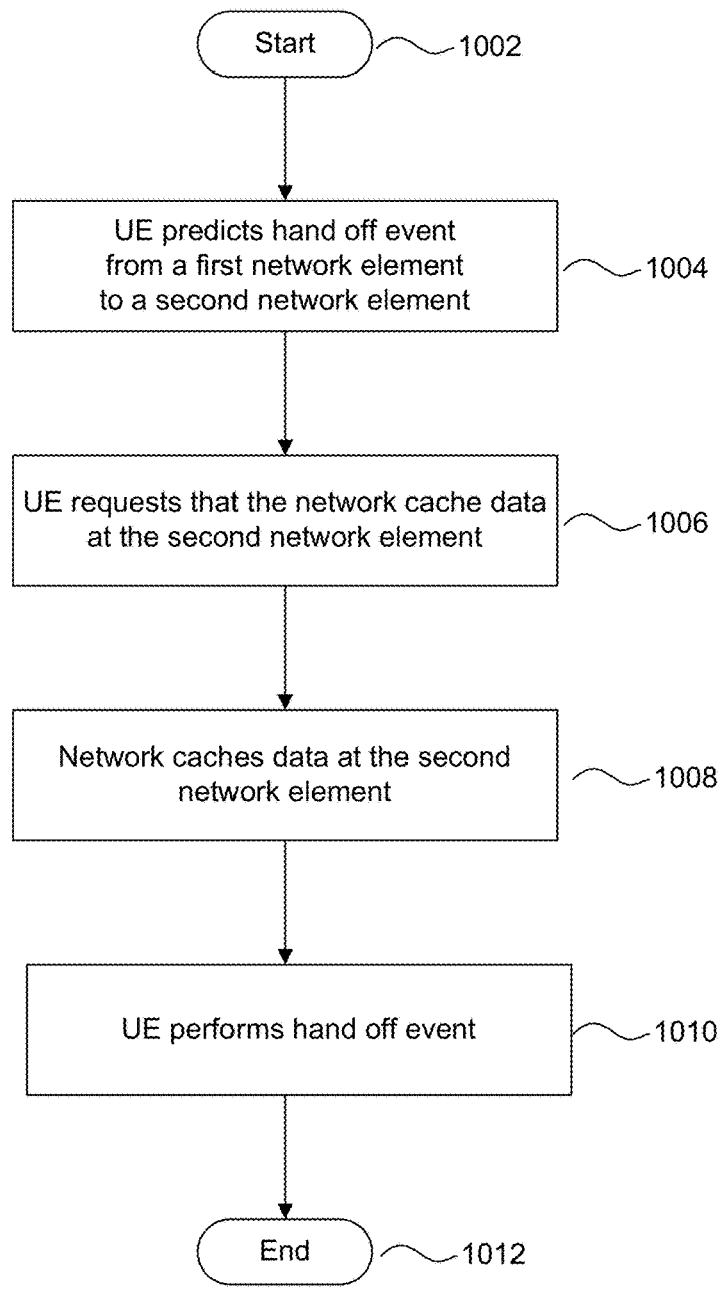
FIG. 10 illustrates a method for handing off wireless communication services between two service providers using network caches, according to an exemplary embodiment of the disclosure.

FIG. 10 is a flowchart of the hand off event when the UE requests that the network cache data, according to an embodiment of the disclosure.

At step 1002, the process starts.

At step 1004, the UE, for example UEs 608a and 608b of FIG. 6, UEs 808a-d of FIG. 8, or the UE in FIG. 9, predicts a hand off event. The UE predicts that it will hand off wireless communication from a first network element, for example a first femto cell, to a second network element, for example a second femto cell. As described above, this prediction can be based on the location of the UE using GPS or other location based services. This prediction may be based on UE motion information. This prediction may also be based on the strength of the current wireless communication service, on the strength of other available wireless communication services, or a combination thereof. A person skilled in the art would understand that these are merely examples of how the prediction can be accomplished, and that other known methods can be used.

At step 1006, the UE requests that the network cache data at the second network element. Based on the prediction, the UE can request the data it will need in the future, for example the next page in an article a user is reading or the next minute of a video a user is watching, be cached at the network element that the UE will eventually hand off wireless communication to.

At step 1008, the network then caches the data at the second network element. This may be the same element that the UE selected, or it may be another element. The network can determine where to cache the data based on information about the data and about the network. For example, as described above, the information about the data may include its size and the QoS needed by the application. Information about the network may include the speed of the network and the size and location of different caches. A person skilled in the art would understand that these are just a few examples of the information that the network may use in determine the location to cache the data.

At step 1010, the UE performs the hand off event. At this point the UE establishes connection with the second network element, and the second network element can provide the UE with the cached data. This allows the UE to more quickly provide data to the user. This also allows the network to more efficiently use network bandwidth.

These and other improvements are contemplated with regard to providing caching within a cross-RAT system.

What is claimed is:

1. A User Equipment (UE), comprising:
    an antenna configured to receive data from a first access point;
    a cache that stores the data; and
    a controller configured to predict if the UE will undergo a connection handoff from the first access point to a second access point, and to request, responsive to predicting that the UE will undergo the connection handoff, a burst of data from the first access point to supplement the data in the cache in preparation for the connection handoff,
    wherein the antenna is further configured to transmit a request for the burst of data to the first access point, and to receive the burst of data from the first access point in response to transmitting the request.

2. The UE of claim 1, wherein the prediction is based on motion information of the UE.

3. The UE of claim 1, wherein the prediction is based on a signal strength from the first access point.

4. The UE of claim 1, wherein the prediction is based on a signal strength from the second access point.

5. The UE of claim 1, wherein the controller is further configured to identify the second access point while the UE uses the data in the cache.

6. The UE of claim 5, wherein the controller is configured to identify the second access point based on cost, data rate, Quality of Service (QoS), or a combination thereof.

7. The UE of claim 1, wherein the controller is further configured to request an increase in a cache size in preparation for the connection handoff.

8. The UE of claim 1, wherein the controller is further configured to request the burst of data to maintain a Quality of Service (QoS) for an application running on the UE during the connection handoff.

9. A User Equipment (UE), comprising:
    an antenna configured to receive data from a first access point;
    a cache that stores the data; and
    a controller configured to predict if the UE will undergo a connection handoff from the first access point to a second access point, and to request, responsive to predicting that the UE will undergo the connection handoff, a burst of data from the first access point to supplement the data in the cache in preparation for the connection handoff,
    wherein the antenna is further configured to transmit a request for the burst of data to the first access point, and to receive the burst of data from the first access point in response to transmitting the request, and
    wherein the prediction is based on the UE approaching a dead zone.

10. A method performed by a User Equipment (UE) for handing off wireless communication, comprising:
    predicting a connection handoff of the UE from a first network element to a second network element;
    responsive to predicting the connection handoff, transmitting a request for a burst of data from a network;
    receiving the requested burst of data in response to transmitting the request;
    caching the requested burst of data; and
    performing the connection handoff from the first network element to the second network element.

11. The method of claim 10, further comprising requesting the burst of data from the first network element.

12. The method of claim 10, wherein the prediction is based on motion information of the UE.

13. The method of claim 10, wherein the prediction is based on a signal strength of the first network element.

14. The method of claim 10, wherein the prediction is based on a signal strength of the second network element.

15. The method of claim 10, further comprising identifying the second network element based on a cost, a data rate, a Quality of Service, or a combination thereof.

16. The method of claim 10, where the prediction is based on the UE approaching a dead zone.

17. The method of claim 10, further comprising using the burst of data to maintain a Quality of Service (QoS) of an application running on the UE while the connection handoff occurs.

* * * * *